United States Patent [19]

Reuter

[11] Patent Number: 5,232,184
[45] Date of Patent: Aug. 3, 1993

[54] SELF-STAGING PARACHUTE APPARATUS

[75] Inventor: James D. Reuter, Manchester, Conn.

[73] Assignee: Pioneer Aerospace Corporation, South Windsor, Conn.

[21] Appl. No.: 949,936

[22] Filed: Sep. 24, 1992

[51] Int. Cl.[5] .................. B64D 17/48; B64D 17/22; B64D 17/54; B64D 17/64

[52] U.S. Cl. .................................. 244/147; 244/148; 244/149

[58] Field of Search .................. 244/137.3, 142, 145, 244/147, 148, 149, 150, 151 A, 151 B, 152

[56] References Cited

U.S. PATENT DOCUMENTS

| | | | |
|---|---|---|---|
| 1,443,745 | 1/1923 | Holt | 244/150 |
| 1,466,988 | 9/1923 | Calthrop | 244/142 |
| 2,358,417 | 9/1944 | Quilter et al. | 244/142 |
| 2,399,100 | 4/1946 | Carr | 244/148 |
| 2,519,923 | 10/1946 | Noelcke, Sr. | 244/148 |
| 2,978,212 | 4/1961 | Istel et al. | 244/148 |
| 2,995,323 | 8/1961 | Dann | 244/150 |
| 3,047,261 | 7/1962 | Bockelmann | 244/150 |
| 3,055,621 | 9/1962 | Martin | 244/152 |
| 3,104,612 | 9/1963 | Knacke et al. | 244/145 |
| 3,278,143 | 10/1966 | Engel, Jr. | 244/150 |
| 3,603,536 | 9/1971 | Dochow | 244/142 |
| 3,690,604 | 9/1972 | Guilfoyle | 244/148 |
| 3,940,095 | 2/1976 | Asciutto | 244/148 |
| 4,058,276 | 11/1977 | Brown | 244/152 |
| 4,087,063 | 5/1978 | Caffey | 244/147 |
| 4,169,568 | 10/1979 | Drew et al. | 244/148 |
| 4,524,930 | 6/1985 | Lindgren et al. | 244/152 |
| 4,623,109 | 11/1986 | Sadeck | 244/152 |
| 4,637,577 | 1/1987 | Miseyko et al. | 244/147 |
| 4,639,229 | 1/1987 | Wright et al. | 244/149 |
| 4,923,150 | 5/1990 | Calkins et al. | 244/148 |
| 4,927,099 | 5/1990 | Emerson et al. | 244/152 |
| 4,955,564 | 9/1990 | Reuter | 244/149 |

FOREIGN PATENT DOCUMENTS

1230319 12/1966 Fed. Rep. of Germany ...... 244/142

Primary Examiner—Joseph F. Peters, Jr.
Assistant Examiner—Virna Lissi Ansley
Attorney, Agent, or Firm—Sperry, Zoda & Kane

[57] ABSTRACT

A self-staging parachute apparatus including a drogue parachute and a main parachute each encapsulated in a respective packing bag with the main parachute packing bag defining a side pocket through which a specialized retention bridle extends from the suspension lines of the drogue chute directly to a load line connected to the load. The load thus utilizes a single point of attachment for both the drogue parachute and the main parachute with the retention bridle of the drogue parachute in movable engagement extending through the pocket of the main parachute deployment bag. The main parachute and drogue parachute when packed are designed to form a generally cylindrical shape whioh is adapted to be easily placed within cylindrical payloads such as flares or the like to facilitate deployment thereof after the rocket motor has been separated.

20 Claims, 4 Drawing Sheets

SELF-STAGING PARACHUTE APPARATUS

BACKGROUND OF THE INVENTION

1. Field Of The Invention

The present invention is designed for providing a multi-stage parachute apparatus utilized with illuminating flares, war missiles, research probes and other devices which are propelled to high speeds by rockets or other propulsion means and utilizes parachutes to provide deceleration and a slow rate of descent. Such parachutes commonly utilize a drogue or initial parachute and a main or final parachute.

The purpose of the drogue is to decelerate the payload from its initial high velocity to a slower speed suitable for deployment of the larger and more lightly built main parachute. This transition from the drogue to the main chute is referred to as "staging". This staging is usually accomplished by some type of mechanism within the payload which causes the drogue to be released and the main parachute to be deployed.

2. Description Of The Prior Art

Examples of prior art structures are as follows: U.S. Pat. No. 3,690,604 patented Sep. 12, 1972 to L. Guilfoyle on a Parachute Stowage and Deployment; U.S. Pat. No. 3,940,095 patented Feb. 24, 1976 to H. Asciutto on a Parachute Assembly; U.S. Pat. No. 4,058,276 patented Nov. 15, 1977 to H. Brown on a Pilot Chute Crown Line Attachment System; U.S. Pat. No. 4,087,063 patented May 2, 1978 to L. Caffey on a Parachute Suspension Line Stowage Device; U.S. Pat. No. 4,169,568 patented Oct. 2, 1979 to G. Drew et al on a Hermetically Sealed Parachute Container; U.S. Pat. No. 4,524,930 patented Jun. 25, 1985 to M. Lindgren et al on a Inflation-Controlled Parachute; U.S. Pat. No. 4,623,109 patented Nov. 18, 1986 to J. Sadeck on a Low Altitude Parachute System; U.S. Pat. No. 4,923,150 patented May 8, 1990 to R. Calkins et al on a Parachute Spring Ring Release; U.S. Pat. No. 4,927,099 patented May 22, 1990 to R. Emerson et al on an Aerodynamic Controllably Vented Pressure Modulating Drogue; and also U.S. Pat. No. 2,358,417 issued to J. R. C. Quilter et al; U.S. Pat. No. 2,399,100 issued to U. H. Carr; U.S. Pat. No. 2,978,212 issued to J. A. Istel et al; U.S. Pat. No. 2,995,323 issued to C. L. Dann; U.S. Pat. No. 3,047,261 issued to V. G. Bookelmann; U.S. Pat. No. 3,055,621 issued to J. Martin and U.S. Pat. No. 3,278,143 issued to H. Engle, Jr.

SUMMARY OF THE INVENTION

The present invention provides a self-staging parachute apparatus particularly usable for controlling descent of a load which includes a load line attached with respect to the particular load to facilitate securement thereto by the decelerating means. A main parachute preferably includes a main canopy and a plurality of main suspension lines attached to the main canopy and extending downwardly therefrom. These main suspension lines are preferably attached with respect to a common main load suspension point to facilitate controlled descending of a given load responsive to deployment of the main parachute.

A main parachute deployment bag is positioned to surround the main parachute to selectively control deployment thereof as desired. The main parachute deployment bag preferably defines a main parachute retaining chamber therein adapted to receive and retain the main parachute packed therein to selectively control deployment thereof. The main parachute deployment bag further defines an opening means therein in fluid flow communication with respect to the main parachute retaining chamber. The main parachute deployment bag may further define a guide therein such as a side pocket member to facilitate control of deployment of the drogue parachute.

The drogue parachute of the present invention will preferably include a drogue canopy and a plurality of drogue suspension lines attached to the drogue canopy and extending downwardly therefrom and attached at a common drogue load suspension point. A supplemental drogue suspension means will be attached with respect to the common drogue load suspension point to extend downwardly therefrom.

A retention bridle means will be positioned extending through the side pocket of the main parachute deployment bag in such as manner as to be movably attached with respect thereto. This retention bridle preferably includes a retention cord attached with respect to the supplemental drogue suspension means and passing through the side pocket of the main parachute deployment bag and also being attached with respect to the load line to retain a given load with respect to the drogue parachute initially during the first stage of descent prior to deployment of the main parachute.

A time-delay cable cutting means may be positioned adjacent the retention cord and preferably within the side pocket of the main parachute deployment bag. This time-delay cable cutting means is responsive to activation thereof for cutting of the retention cord to facilitate release of the drogue parachute from the load line. A lanyard is preferably included attaching the supplemental drogue suspension means with respect to the main parachute deployment bag to facilitate removal thereof from around the main parachute canopy responsive to release of the drogue parachute and allow deployment of the main parachute. The lanyard which attaches the supplemental drogue suspension lines with respect to the main parachute deployment bag is responsive to actuation of the time-delay cutting means to remove the main parachute deployment bag from around the main parachute means in such a manner as to allow the main parachute to exit the main parachute retaining chamber through the lower opening defined therein to allow deployment of the main canopy of the main parachute and thus enter the second and final stage of deployment of the self-staging parachute apparatus of the present invention.

To facilitate control of the main parachute and the drogue parachute with respect to one another, the retention bridle securing the drogue parachute with respect to the load line means will preferably extend through the side pocket means in the main parachute deployment bag such that both the drogue parachute deployment bag and the main parachute can be connected with respect to the load at a single mounting point.

Preferably the drogue parachute deployment bag as well as the main parachute deployment bag will be made of a fabric material which is of relative light weight to facilitate packing and to facilitate deployment of the parachute retained therein.

In the preferred configuration the drogue parachute deployment bag and the main parachute deployment when packed will each form a complementary partial cylindrical shape such as when juxtaposed they will form a generally cylindrical shape to facilitate mounting thereof within a flare or rocket housing.

A pre-deployment tie line may preferably be positioned extending around the main parachute deployment bag and drogue parachute deployment bag when positioned adjacent to one another such as to retain them in the general cylindrical configuration prior to removal from the rocket/flare composite structure.

The time-delay cable cutting means will include a sear pin extending therein. This sear pin is operative such as when removed to initiate activation of the time-delay cable cutting means after the given time delay pre-set therein. Preferably this time delay will be approximately four seconds. The sear pin includes a sear line means attached thereto which is then preferably attached with respect to the load line means such that when the drogue is deployed during the initial stage the tension will cause the sear line to become taut and withdraw the sear pin from the time-delay cable cutting means and thereby initiate the approximately four second countdown to launching of the second stage or deployment of the main canopy.

It is an object of the present invention to provide a self-staging parachute apparatus, being usable for controlling descent of the given load, wherein repetitive usage of the same apparatus is made possible.

It is an object of the present invention to provide a self-staging parachute apparatus, being usable for controlling descent of the given load, wherein initial costs for capital outlay is minimized.

It is an object of the present invention to provide a self-staging parachute apparatus, being usable for controlling descent of the given load, wherein equipment down time is minimized.

It is an object of the present invention to provide a self-staging parachute apparatus, being usable for controlling descent of the given load, wherein usage with many types of illuminating flares, war missiles and research probes or other devices propelled to high speeds by rocket or other means is particularly achievable.

It is an object of the present invention to provide a self-staging parachute apparatus, being usable for controlling descent of the given load, wherein the amount of space occupied by the descent control means within the rocket/flare structure is minimized.

It is an object of the present invention to provide a self-staging parachute apparatus, being usable for controlling descent of the given load, wherein the weight of the descent control means positioned within the rocket/flare configuration is significantly minimized.

It is an object of the present invention to provide a self-staging parachute apparatus, being usable for controlling descent of the given load, wherein both the main parachute and the drogue parachute when packed are simultaneously removed from abutting contact with the load.

It is an object of the present invention to provide a self-staging parachute apparatus, being usable for controlling descent of the given load, wherein multiple lines of rigging cords extend within the retention bridle to significantly minimize the size of the time-delay cable cutting means required to be utilized.

It is an object of the present invention to provide a self-staging parachute apparatus, being usable for controlling descent of the given load, wherein activation of the time-delay cutter is caused automatically when tension forces cause extraction of its sear pin therefrom responsive to initial deployment of the drogue parachute.

It is an object of the present invention to provide a self-staging parachute apparatus, being usable for controlling descent of the given load, wherein usage within the configuration of drogue parachute is made possible.

It is an object of the present invention to provide a self-staging parachute apparatus, being usable for controlling descent of the given load, wherein usage with any type or shape of main parachute is made possible.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a means for controlling descent of a load 10. This load could be an illuminating flare, war missile, research probe or any other device which is propelled to high speed by a rocket 74 or other similar high speed propulsion device which is designed to decelerate and have a slow rate of descent.

With the present invention the load 10 will include a load line means 12 extending therefrom. This load line means 12 will be adapted to receive securement of both the initial drogue parachute 32 which is deployed in the first stage and the main parachute 14 which is deployed in the second or final stage.

Main parachute 14 includes a main canopy 16 with a plurality of main suspension lines 18 extending downwardly therefrom to a common main load suspension point 20. This common main load suspension point 20 is attached with respect to the load line 12 to provide the main stage of descent of the load 10 secured thereto.

When initially packed the main canopy 16 of the main parachute 14 is located within the main parachute retaining chamber 24 defined within a main parachute deployment bag 22. This main parachute deployment bag 22 includes a lower opening means 26 to facilitate removal of the main parachute 14 therefrom as desired.

The drogue parachute means 32 will include a drogue canopy 34 and a drogue suspension line means 36. The drogue suspension line means 36 are interconnected at a common drogue load suspension point 38. Supplemental drogue suspension means 40 extend downwardly from the common drogue load suspension point 38 and are attached with respect to a retention bridle 44 which in turn is secured with respect to the load line 12 to provide the interconnection between the drogue parachute 32 and the load 10.

The retention bridle means 44 includes a retention cord means 46 which is secured with respect to the supplemental drogue suspension lines 40 as well as being attached to the load line 12. A time-delay cable cutting means 48 is positioned adjacent to the retention cord means 46 to selectively cut this cord 46 in order to initiate deployment of the main parachute 14 and initiation of the second stage of self-staging parachute apparatus of the second stage of self-staging parachute apparatus of the present invention.

Figure 14:
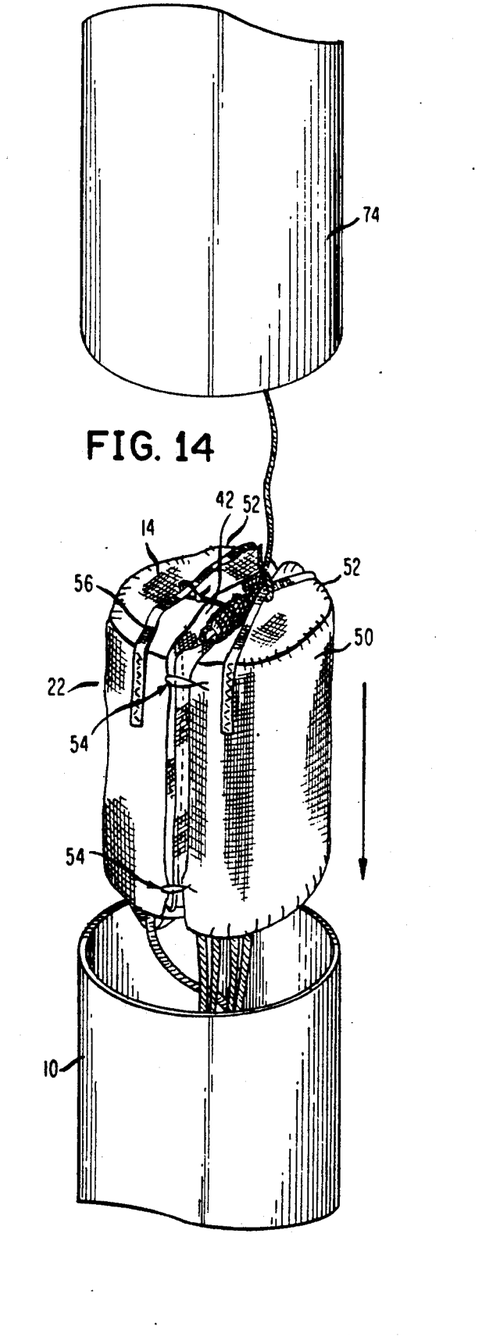
FIG. 14 is an illustration of an embodiment of the self-staging parachute apparatus of the present invention shown in complementary generally cylindrical shape being placed within a rocket/flare structure.

The drogue parachute means 32 is initially retained within a drogue parachute deployment bag 50. Preferably the drogue parachute deployment bag 50 will comprise a portion of a cylindrical shape while the packed main parachute 14 within the main parachute deployment bag 22 will comprise a complementary partial cylindrical shape such that when these two packed parachutes are positioned next to one another they will assume an overall general cylindrical shape 52. When forming this cylindrical shape 52 a pre-deployment time means 58 may be included to retain these two packed parachutes in this cylindrical shape 52. When in this configuration the designs are particularly useful for placement within a payload or flare 10 as best shown in FIG. 14.

To facilitate control of operation between the first and second stage of the present invention the main parachute deployment bag 24 will preferably include a guide means 28 thereon preferably taking the form of a side pocket means 30. This side pocket means 30 will be adapted to receive the retention bridle 44 extending therethrough. During the initial stage of deployment of the apparatus of the present invention with the drogue canopy 34 deployed and the main parachute 14 being not yet deployed, the retention bridle 44 which attaches the drogue parachute 32 with respect to the load 10 will pass through the side pocket means 30 of the main parachute deployment bag 22 and thereby control positioning thereof prior to deployment of the main parachute 14.

Once the drogue parachute 32 is completely deployed sufficient tension will be placed upon the retention bridle 44 such that the sear pin 66 will be removed from the time-delay cable cutting means 48. This sear pin is attached to a sear pin line 68 which is preferably attached with respect to the load line 12 such that when the drogue canopy 34 exerts tension upon the retention bridle 44 the sear pin 66 will be removed from the time-delay cable cutting means 48. Once this sear pin 66 is so removed the time delay of approximately four seconds will be initiated causing activation of the cable cutting means four seconds thereafter. This activation initiates deployment of the second stage of the apparatus of the present invention.

When the cable cutting means 48 is activated the retention cord 46 will be severed causing the drogue parachute 32 to be released from attachment with respect to the load 10. The main parachute deployment bag 22 preferably includes a removal strap 56 which is interconnected with respect to the drogue suspension lines 36 by a lanyard means 42. This lanyard will strip the main parachute deployment bag 22 from the main canopy 16 and allow deployment thereof and thus automatically launch the second stage of the self-staging parachute apparatus of the present invention. At this point the main parachute cord means 72 will facilitate interconnection between the main parachute 14 and the load line 12.

Figure 1:
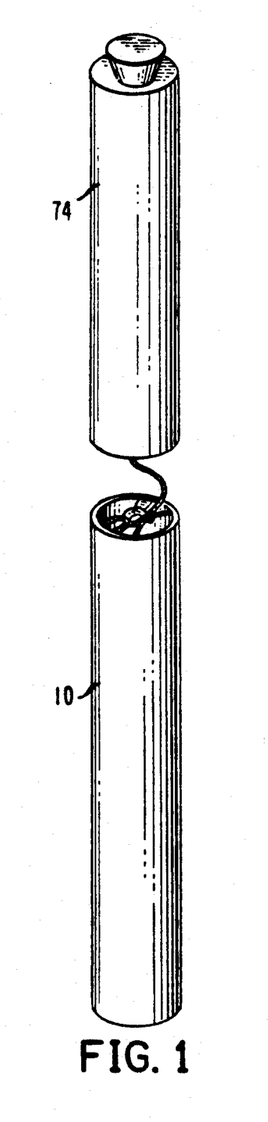
FIG. 1 is an embodiment of the self-staging parachute apparatus of the present invention shown initially with the extraction line leading to the spent rocket being still slack.
Figure 2:
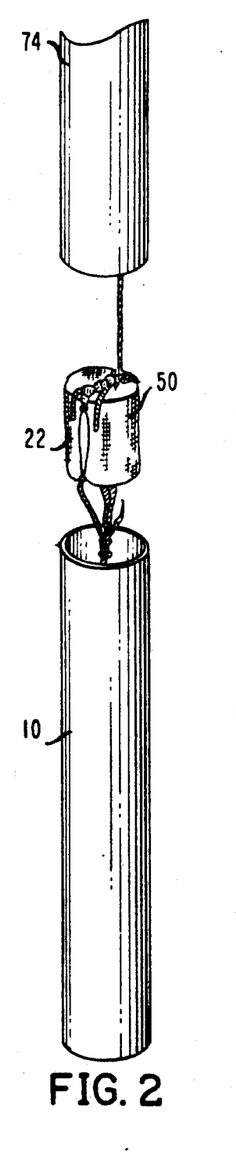
FIG. 2 is an illustration of the embodiment shown in FIG. 1 at a slightly later time with the staging cords taut.
Figures 3, 4:
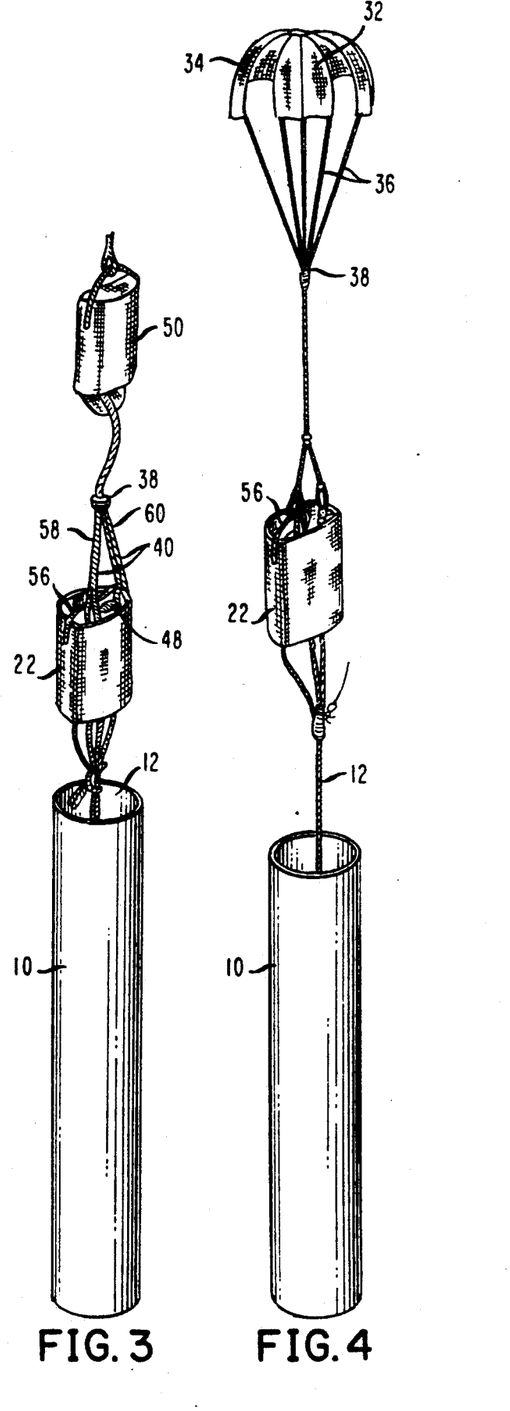
FIG. 3 is an illustration of the configuration shown in FIG. 2 at a slightly later time with the drogue pack extracted further.
FIG. 4 is an illustration of the configuration shown in FIG. 3 at a slightly later time with the drogue parachute inflating.
Figure 5:
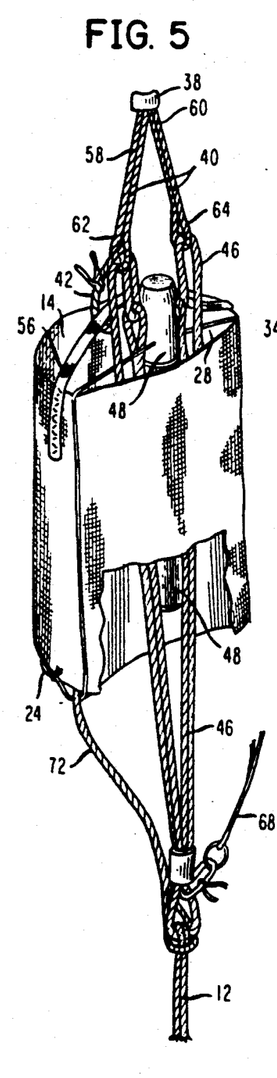
FIG. 5 is an exploded view of an embodiment of the main parachute deployment bag means and the retention bridle of the configuration shown in FIG. 4.
Figures 6, 7:
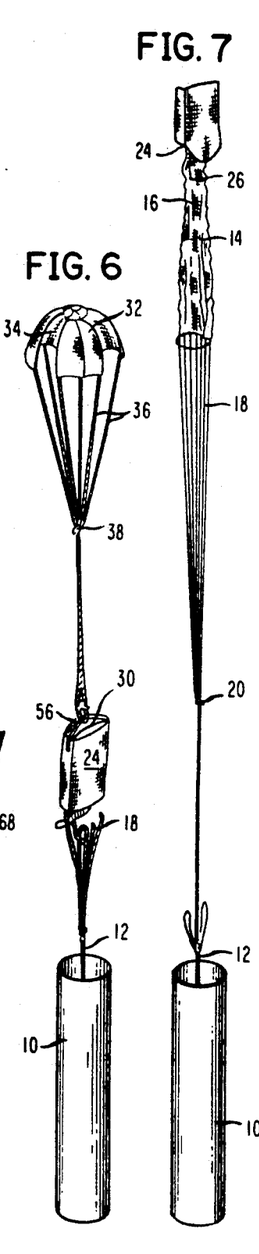
FIG. 6 is a view of the configuration shown in FIG. 4 at a slightly later time when the retention cord time-delay cutter is fired.
FIG. 7 is an illustration of the embodiment shown in FIG. 6 at a slightly later time when the main parachute is being stripped out for deployment.
Figure 8:
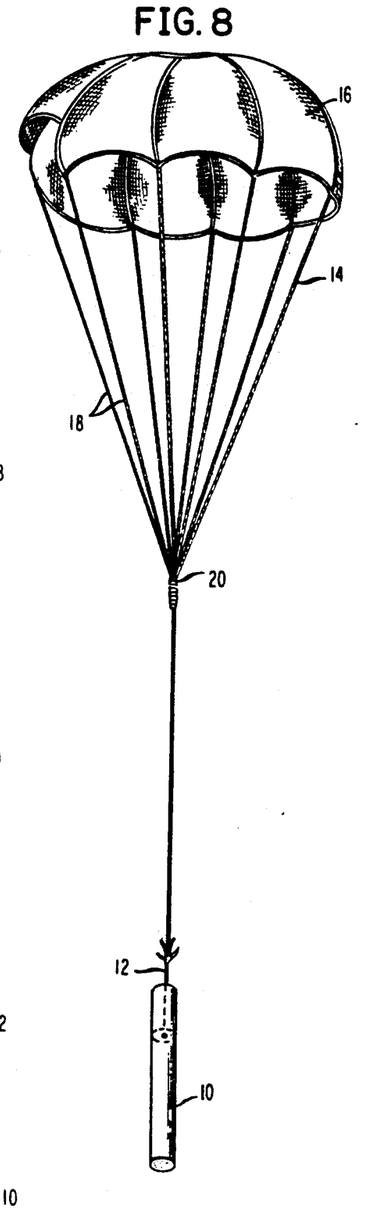
FIG. 8 is an illustration of the embodiment shown in FIG. 7 after deployment of the main canopy means.
Figures 9, 10, 11:
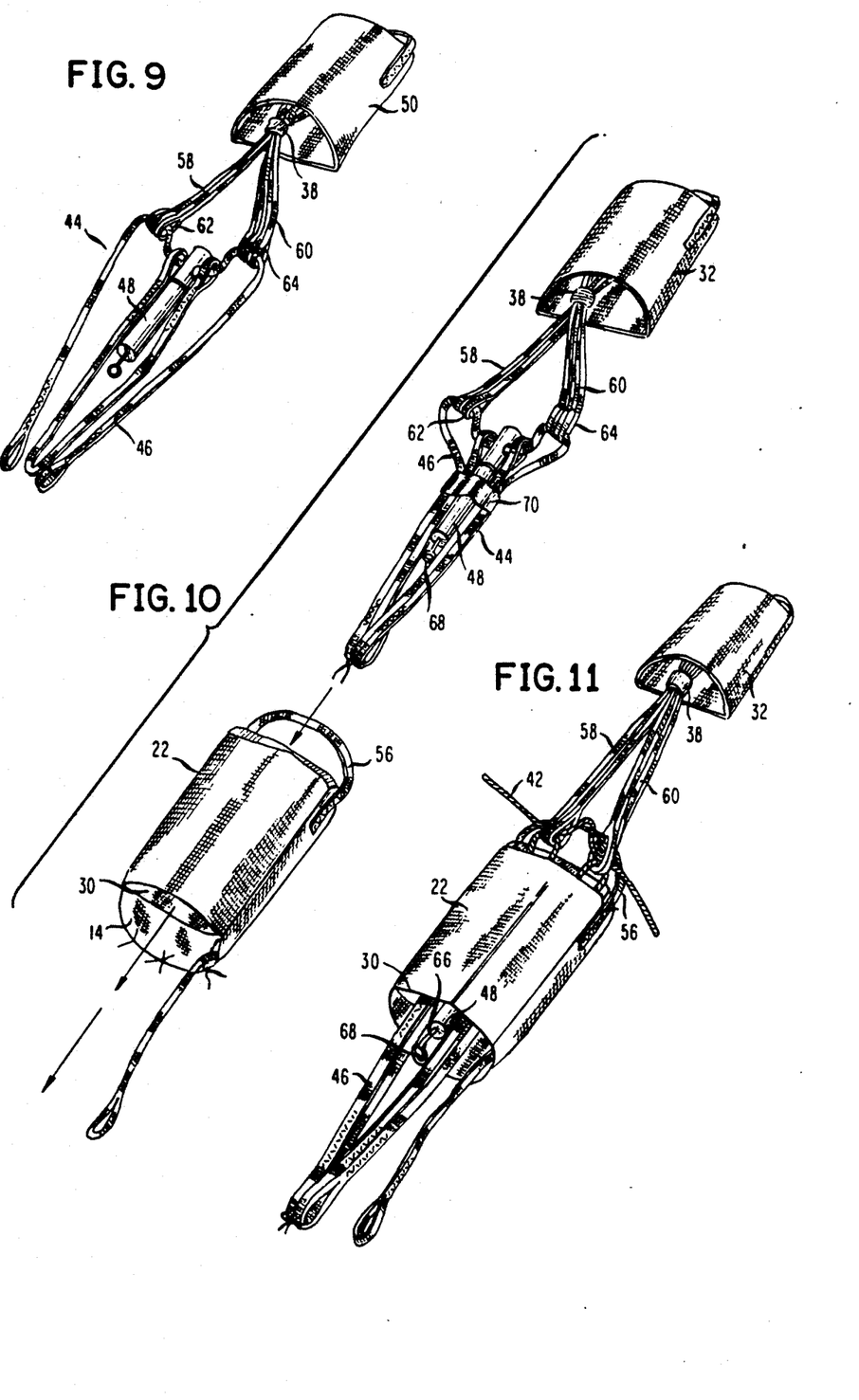
FIG. 9 is an illustration of an embodiment of the retention bridle of the present invention.
FIG. 10 is an illustration of an embodiment of the retention bridle being inserted into the side pocket of an embodiment of the main parachute deployment bag of the present invention.
FIG. 11 is an illustration of the embodiment shown in FIG. 10 with the retention bridle in place within the side pocket.
Figure 12:
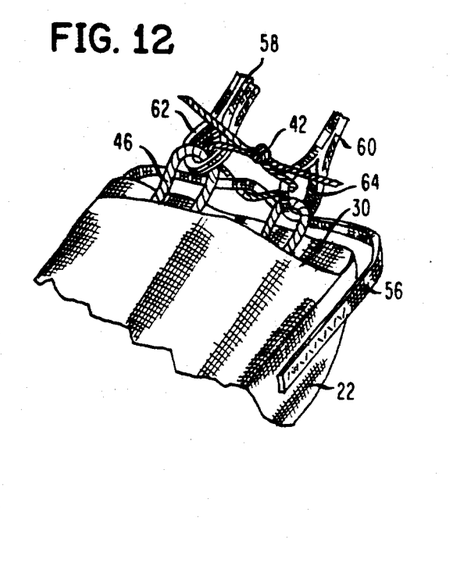
FIG. 12 is an exploded view of FIG. 11 showing a close-up of the interconnection between the supplemental drogue suspension means and the retention bridle.
Figure 13:
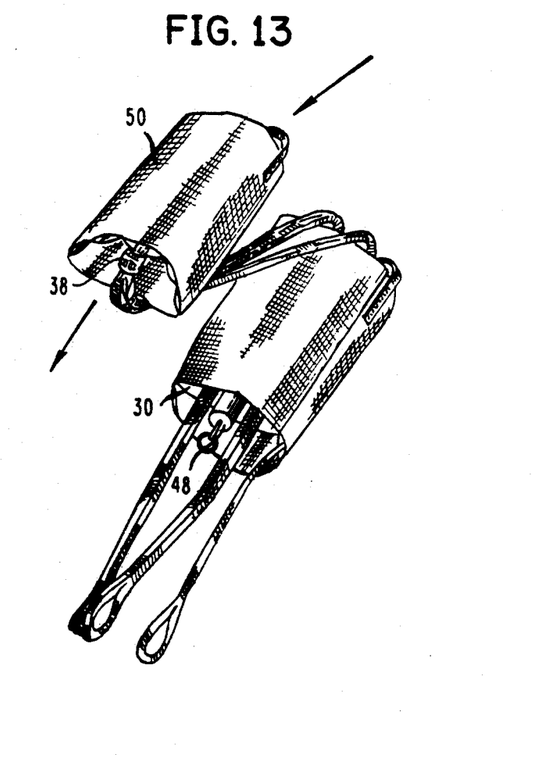
FIG. 13 is an illustration of an embodiment of the configuration of the self-staging parachute apparatus of the present invention with the drogue parachute and main parachute packed together to form the complete shape of the cavity in which they are packed.

To facilitate control and positioning of the retention bridle 44 prior to deployment thereof a rigging aid means 70 as best shown in FIG. 10 will surround and engage the time-delay cable cutting means 48 as well as the retention cord 46. In this manner positioning thereof within the side pocket means 30 of the main parachute deployment bag 22 will be significantly facilitated.

The supplemental drogue suspension means 40 preferably comprises a first supplemental drogue suspension line means 58 and a second supplemental drogue suspension line means 60 as best shown in FIGS. 9, 10 and 11. Each of these supplemental drogue suspension line means includes a respective supplemental loop means in the lowermost end thereof. For example, the first supplemental drogue suspension lines means 58 includes a first supplemental loop means 62 in the lowermost end thereof. In a similar fashion the second supplemental drogue suspension line means 60 includes a second supplemental loop means 64 in the lowermost end thereof to facilitate movable interconnection with respect to the retention cord 46 of retention bridle 44. With these multiple connections the minimum test strength of the retention cord means 46 can be significantly decreased thereby allowing for a significantly smaller time-delay cable cutting means 48 thereby achieving significant savings in expense and weight.

The time delay of the time-delay cable cutting means 48 is preferably in the area of four seconds but this time delay can be chosen at any desired time delay based upon the overall physical characteristics of the self-staging parachute deployment apparatus as well as the particular load or rocket configuration currently being utilized. Also it is preferable in order to minimize weight and to maximize strength that the main parachute deployment bag means 22 as well as the drogue parachute deployment bag means 50 be made of a fabric material.

The present invention is particularly novel in providing a distinct attachment point for both the drogue 32 as well as a means for releasing at the proper time which minimizes cost and also minimizes space consumption. With this apparatus the attachment point both the drogue parachute 32 and the main parachute 14 are at a common location and the method for staging of deployment of the respective parachutes at the proper time is an integral part of the total packed parachute system.

Furthermore the present invention is particularly novel in that both parachutes are removed simultaneously from the load 10 with the drogue parachute being immediately thereafter deployed at the time of initiation of the first stage.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A self-staging parachute apparatus, being usable for controlling descent of a given load, comprising:
   A. a load line means attached to a given load to facilitate securement thereto;
   B. a main parachute means including a main canopy means and a plurality of main suspension line means attached to said main canopy means and extending downwardly therefrom and attached with respect to a common main load suspension point, said load line means being attached with respect to said common load suspension point to facilitate controlled descent of a given load responsive to deployment of said main parachute means;
   C. a main parachute deployment bag means surrounding said main parachute means to selectively control deployment thereof, said main parachute deployment bag defining a main parachute retaining chamber therein adapted to receive said main parachute means packed therein to selectively prevent deployment thereof while said main canopy means is retained therein, said main parachute deployment bag means defining a lower opening means therein in fluid flow communication with respect to said main parachute retaining chamber, said main parachute deployment bag means defining a guide means therein;
   D. a drogue parachute means including a drogue canopy means and a plurality of drogue suspension line means attached with respect to said drogue canopy means and extending downwardly therefrom and attached at a common drogue load suspension point;
   E. a supplemental drogue suspension means attached with respect to the common drogue load suspension point and extending downwardly therefrom;
   F. a lanyard means attaching said supplemental drogue suspension means with respect to said main parachute deployment bag means to facilitate removal thereof from around said main parachute means responsive to release of said drogue parachute means and allow deployment of said main parachute means;
   G. a retention bridle means positioned extending through said guide means of said main parachute deployment bag to be movably attached with respect thereto, said retention bridle means including:
      1) a retention cord means attached with respect to said supplemental drogue suspension means and passing through said guide means of said main parachute deployment bag means and also being attached with respect to said load line means to retain a given load with respect to said drogue parachute means initially during a first stage of descent prior to deployment of said main parachute means; and
      2) a time-delay cable cutting means positioned adjacent said retention cord means, said time-delay cable cutting means being responsive to activation thereof for cutting of said retention cord means to facilitate release of said drogue parachute means from said load line means, said lanyard means attaching said supplemental drogue suspension means with respect to said main parachute deployment bag means and being responsive to activation of said time-delay cutting means to remove said main parachute deployment bag means from around said main parachute means and allow said main parachute to exit said main parachute retaining chamber through said lower opening means for deployment of said main canopy means of said main parachute means.

2. A self-staging parachute apparatus being usable for controlling descent of a given load as defined in claim 1 wherein said guide means comprises a side pocket means defined in said main parachute deployment bag means and wherein said retention bridle means extends through said pocket means to facilitate attachment of said supplemental drogue suspension means with respect to said main parachute means during a first stage of deployment.

3. A self-staging parachute apparatus being usable for controlling descent of a given load as defined in claim 1 further comprising a drogue parachute deployment bag means surrounding said drogue parachute means to selectively control deployment thereof.

4. A self-staging parachute apparatus being usable for controlling descent of a given load as defined in claim 3 wherein said drogue parachute deployment bag means is made from fabric material.

5. A self-staging parachute apparatus being usable for controlling descent of a given load as defined in claim 3 wherein said drogue parachute means packed within said drogue parachute deployment bag means and said main parachute packed within said main parachute deployment bag means are each of complementary partial cylindrical shapes such as to comprise an overall approximate cylindrical shape when juxtaposed prior to deployment.

6. A self-staging parachute apparatus being usable for controlling descent of a given load as defined in claim 5 further including a pre-deployment tie means extending about said main parachute deployment bag means and said drogue parachute deployment bag means in juxtaposition prior to deployment of said main parachute means and said drogue parachute means.

7. A self-staging parachute apparatus being usable for controlling descent of a given load as defined in claim 1 wherein said main parachute deployment bag is made from fabric material.

8. A self-staging parachute apparatus being usable for controlling descent of a given load as defined in claim 1 wherein said main parachute deployment bag further includes a removal strap adapted to be attached with respect to said supplemental drogue suspension means by said lanyard means to facilitate removal of said main parachute deployment bag from around said main parachute means responsive to release of said drogue parachute means to allow deployment of said main parachute means.

9. A self-staging parachute apparatus being usable for controlling descent of a given load as defined in claim 1 wherein said supplemental drogue suspension means comprises a first supplemental drogue suspension line means and a second supplemental drogue suspension line means.

10. A self-staging parachute apparatus being usable for controlling descent of a given load as defined in claim 9 wherein said retention cord means is movably attached to said first supplemental drogue suspension line means at a first retention position and is movably attached to said second supplemental drogue suspension line means at a second retention position with said time-delay cable cutting means positioned adjacent said retention cord means for selective cutting thereof at a location between said first retention position and said second retention position.

11. A self-staging parachute apparatus being usable for controlling descent of a given load as defined in claim 10 wherein said first supplemental drogue suspension line means includes first supplemental loop means therein with said retention-cord extending movably therethrough.

12. A self-staging parachute apparatus being usable for controlling descent of a given load as defined in claim 11 wherein said second supplemental drogue suspension line means includes second supplemental loop means therein with said retention cord extending movably therethrough.

13. A self-staging parachute apparatus being usable for controlling descent of a given load as defined in claim 12 wherein said retention cord means and said time-delay cable cutting means are attached with respect to each other by a rigging aid means.

14. A self-staging parachute apparatus being usable for controlling descent of a given load as defined in claim 1 wherein said time-delay cable cutting means includes a sear pin extending therein and is adapted to delay activation of said time-delay cable cutting means after removal therefrom.

15. A self-staging parachute apparatus being usable for controlling descent of a given load as defined in claim 14 wherein said time-delay cable cutting means is operable to activate and cut said retention cord means approximately four seconds after removal of said sear pin therefrom.

16. A self-staging parachute apparatus being usable for controlling descent of a given load as defined in claim 14 further comprising a sear pin line attached with respect to said sear pin means and said load line means and operable to remove said sear pin from said time-delay cutting means responsive to deployment of said drogue parachute means.

17. A self-staging parachute apparatus being usable for controlling descent of a given load as defined in claim 2 wherein said time-delay cable cutting means is positioned within said side pocket means to facilitate cutting of said retention cord means.

18. A self-staging parachute apparatus being usable for controlling descent of a given load as defined in claim 1 wherein said main parachute deployment bag means and said drogue parachute deployment bag means are released from a given load prior to deployment of said drogue parachute canopy means.

19. A self-staging parachute apparatus being usable for controlling descent of a given load as defined in claim 18 wherein said main parachute deployment bag means and said drogue parachute deployment bag means are simultaneously released from a given load means when packed.

20. A self-staging parachute apparatus, being usable for controlling descent of a given load, comprising:
   A. a load line means attached to a given load to facilitate securement thereto;
   B. a main parachute means including a main canopy means and a plurality of main suspension line means attached to said main canopy means and extending downwardly therefrom and attached with respect to a common main load suspension point, said load line means being attached with respect to said common load suspension point to facilitate controlled descent of a given load responsive to deployment of said main parachute means;
   C. a main parachute deployment bag means of fabric material surrounding said main parachute means to selectively control deployment thereof, said main parachute deployment bag defining a main parachute retaining chamber therein adapted to receive said main parachute means packed therein to selectively prevent deployment thereof while said main parachute means is retained therein, said main parachute deployment bag means defining a lower opening means therein in fluid flow communication with respect to said main parachute retaining chamber, said main parachute deployment bag means defining a guide means therein, said guide means comprising a side pocket means defined in said main parachute deployment bag means, said main parachute deployment bag means further including a removal strap means to facilitate removal of said main parachute means from said main parachute deployment bag means;
   D. a drogue parachute means including a drogue canopy means and a plurality of drogue suspension line means attached with respect to said drogue canopy means and extending downwardly therefrom and attached at a common drogue load suspension point;
   E. a drogue parachute deployment bag means of fabric material surrounding said drogue canopy means to selectively control deployment thereof, said drogue parachute means packed within said drogue parachute deployment bag means and said main parachute packed within said main parachute deployment bag means each being of complementary partial cylindrical shapes such as to comprise an overall approximate cylindrical shape when juxtaposed prior to deployment thereof;
   F. a pre-deployment tie means extending about said main parachute deployment bag means and said drogue parachute deployment bag means in juxtaposition prior to deployment of said main parachute means and said drogue parachute means;

G. a supplemental drogue suspension means attached with respect to the common drogue load suspension point and extending downwardly therefrom, said supplemental drogue suspension means comprising a first supplemental drogue suspension line means and a second supplemental drogue suspension line means;

H. a lanyard means attaching said supplemental drogue suspension means with respect to said removal strap means of said main parachute deployment bag means to facilitate removal thereof from around said main parachute means responsive to release of said drogue parachute means and allow deployment of said main parachute means;

I. a retention bridle means positioned extending through said side pocket means of said main parachute deployment bag to be movably attached with respect thereto, said retention bridle means including:
 1) a retention cord means attached with respect to said first supplemental drogue suspension line means and said second supplemental drogue suspension line means of said supplemental drogue suspension means and passing through said side pocket means of said main parachute deployment bag means and also being attached with respect to said load line means to retain a given load with respect to said drogue parachute means initially during a first stage of descent prior to deployment of said main parachute means;
 2) a time-delay cable cutting means positioned extending around said retention cord means at a position between said first supplemental drogue suspension line means and said second supplemental drogue suspension line means, said time-delay cable cutting means being responsive to activation thereof for cutting of said retention cord means to facilitate release of said drogue parachute means from said load line means, said lanyard means attaching said supplemental drogue suspension means with respect to said main parachute deployment bag means and being responsive to activation of said time-delay cutting means to remove said main parachute deployment bag means from around said main parachute means and allow said main parachute to exit said main parachute retaining chamber through said lower opening means for deployment of said main canopy means of said main parachute means, said time-delay cable cutting means including a sear pin extending therein and adapted to delay activation of said time-delay cable cutting means for approximately four seconds after removal therefrom;
 3) a sear pin line means attached with respect to said sear pin means and said load line means and operable to remove said sear pin from said time-delay cutting means responsive to deployment of said drogue parachute means; and J. a rigging aid means extending around said retention cord means and said time-delay cable cutting means.

* * * * *